US005800750A

United States Patent [19]
Laing et al.

[11] Patent Number: 5,800,750
[45] Date of Patent: Sep. 1, 1998

[54] METHOD FOR MOLD PROTECTION OF CRANK-TYPE CLAMPING UNIT

[75] Inventors: Muh-Wang Laing, Miau Li; Shui-Bin Horng, Hsinchu; Chin-Yu Chao, Shin Ying; Han-Chieh Chang, Taipei; Chung-Hsih Hsiao, Jia Yi, all of Taiwan

[73] Assignee: Industrial Technology Research Institute, Hsinchu, Taiwan

[21] Appl. No.: 663,758

[22] Filed: Jun. 14, 1996

[51] Int. Cl.⁶ .................. B29C 45/77; B29C 45/80
[52] U.S. Cl. ............ 264/40.5; 264/328.1; 364/475.05; 425/150; 425/593; 425/451.6; 425/136
[58] Field of Search ................ 264/40.1, 40.5, 264/328.1; 364/475.05, 475.08; 425/149, 150, 593, 592, 451.5, 451.6, 136, 137, 138

[56] References Cited

U.S. PATENT DOCUMENTS

| | | | |
|---|---|---|---|
| 4,540,359 | 9/1985 | Yamazaki | 425/593 |
| 4,710,119 | 12/1987 | Otake | 425/136 |
| 4,847,779 | 7/1989 | Masao et al. | 264/40.5 |
| 4,849,678 | 7/1989 | Kamiguchi et al. | 264/40.1 |
| 5,045,253 | 9/1991 | Kamiguchi et al. | 425/593 |
| 5,059,365 | 10/1991 | Hertzer et al. | 425/593 |
| 5,069,613 | 12/1991 | Inaba et al. | 264/40.5 |
| 5,149,471 | 9/1992 | Catanzaro et al. | 425/593 |
| 5,180,530 | 1/1993 | Cropper et al. | 425/593 |
| 5,190,714 | 3/1993 | Reinhart | 425/593 |
| 5,251,146 | 10/1993 | Neko et al. | 264/40.5 |
| 5,279,778 | 1/1994 | Taira et al. | 425/593 |
| 5,362,222 | 11/1994 | Faig et al. | 264/40.5 |
| 5,370,524 | 12/1994 | Liang et al. | 425/556 |
| 5,547,619 | 8/1996 | Obayashi | 264/40.5 |

*Primary Examiner*—Jill L. Heitbrink
*Attorney, Agent, or Firm*—W. Wayne Liauh

[57] ABSTRACT

A method and apparatus for mold protection of motor-driven clamping unit is provided. The method and apparatus is based on high response characteristics of the motor and a new control method. A continuously variable restrictive motor output scheme is used in conjunction with the mechanics characteristics of the toggle mechanism to maintain a substantially constant mold protective force at all positions. Further, the mold protective force can be adaptively adjusted with respect to different types of molds and motional conditions so that the mold can be adequately protected whenever abnormal condition occurs during mold closing action. The motor output will thus not unduly increased to a great level that would damage the mold, the machine, or even the operators. The drawbacks of the prior art are thus eliminated.

4 Claims, 14 Drawing Sheets

METHOD FOR MOLD PROTECTION OF CRANK-TYPE CLAMPING UNIT

BACKGROUND OF THE INVENTION

1. Field of the Invention

The present invention relates to crank-type clamping unit, and more particularly, to a method and apparatus for mold protection of a motor-driven crank-type clamping unit provided, for example, on injection molding machines, die casting machines, auto-molding machines, and the like.

2. Description of Prior Art

A conventional injection molding machine is typically composed of a platform, a clamping unit, an injection unit, and a hydraulic driving system. FIG. 1 shows a perspective view of a clamping unit 1 which is mounted between a front platen 2 and a rear platen 3 and provided with a movable platen 5 moving along four tie bars 4. The movable platen 5 is linked to rear platen 3 by means of a toggle mechanism 6 which is driven by a hydraulic cylinder 7 so as to move the movable platen 5 toward or away from the front platen 2. The toggle mechanism 6 can be either four-point type or five-point type, or outward-bending type or inward-bending type. All of these types can be analyzed for characteristics by means of the WATT II 6-linkage mechanism as shown in FIG. 2.

The toggle mechanism 6, with its excellent motional characteristics, is suitable for use in the clamping unit 1. The movable platen 5 is at low speed in the end section of the clamping unit 1 and, by means of increasing the input force from the hydraulic cylinder 7, fastens the mold into self-lock status. However, due to variation in the ratio of speed at the input to the speed at the output, the amplification of the force (i.e., the mechanism advantage) is varied at different positions. In other words, if the same hydraulic cylinder 7 is used for power generation, the power applied to the movable platen 5 will be different at different positions. Therefore, if the machine is to achieve the same mold protective force for the mold when the mold is to be closed, the output of the hydraulic cylinder 7 should be varied with respective to positions. FIG. 3 shows a graph in which the left longitudinal axis represents the output force of the movable platen 5 and the right longitudinal axis represents the driving force of the hydraulic cylinder 7. In this graph, the segment x1–x2 represents the range within which the mold is to be protected. As shown, if the hydraulic cylinder 7 produces a constant driving force P1 to the toggle mechanism 6, as indicated by the line L2, the output force acting on the movable platen 5 is varied with respective to position; for example at x1 the output force is F1 and at x2 where the movable platen 5 is about to come in touch with the front platen 2, the output force will be F2 which is much greater than F1 due to larger mechanism advantage. The curve L1 represents the change of output force with the mold protection range. Therefore, in order to maintain the same mold protective force within the mold protection range (i.e., the output is maintained at F1 at any positions in the range x1–x2), the driving force of the hydraulic cylinder 7 should be varied in such a way as depicted by the curve L3 in FIG. 3.

Conventional hydraulic type of injection molding machines, due to lack of suitable control, can only set a constant driving force limitation (L2 in FIG. 3) within the mold protection range and is thus unable to get same mold protective force at any positions within the mold protection range. Consequently, when a thick alien object exists in the mold, the protective capability would be acceptable due to the low mechanism advantage; however, if the alien object is thin, causing the mechanism advantage to be larger, such as abnormal condition would be detected after the mold has suffered tremendous force (the advantage of the toggle mechanism when a thin alien object exists could be ten times greater than when a thick alien object exists). Being used to the conventional control method, even the latest fully electrical injection molding machines (all motion are driven by motor) still display no improvements in the mold protective capability.

Moreover, the mold protection range in conventional clamping unit is carried out with low pressure and speed due to slow response of the hydraulic system, the protective effect and the acting speed (or production efficiency) will be in contrast against each other. Besides, the mold protection end point (or the switching point for high-pressure mold locking) is hard to decide so that the mold can be protected when a very small alien object such as filament is left. Therefore, in accordance with the present invention, an electrical motor-driven toggle mechanism is used in substitute for the conventional hydraulic cylinder (i.e., the conventional hydraulic cylinder is substituted by a transmission system comprising motor, belt, ball screw and ball screw nut). The electrical motor-driven toggle mechanism, with its high stability and response in servo control, allows for safe protection, easy operation, and high production efficiency of the machine.

SUMMARY OF THE INVENTION

The present invention provides a solution to the drawbacks of the prior art described in the foregoing background section of this specification by means of (1) changing the value of the restrictive torque from the servo motor so as to obtain a consistent mold protective force, (2) determining the mold protection end point by the mold locking force auto adjustment method, and (3) the use of adaptive servo control system for rapid, safe closing of the mold.

(1) Changing the Value of the Restrictive Torque From the Servo Motor so as to Obtain a Consistent Mold Protective Force In accordance with the present invention, the mechanism advantage characteristic of the toggle mechanism varied with respect to position can be changed for the purpose of obtaining a consistent mold protective force by varying the motor torque. The relationship is as follows:

$$Fin(s) \times K(s) = Fout$$

wherein s is the position of the ball screw nut;

Fout is the force required to move the movable platen at desired speed;

K(s) is the mechanism advantage of the toggle mechanism which varies with respect to the position s of the ball screw nut; and Fin(s) is the driving force generated by the motor.

The foregoing equation, as determined the speed versus position relationship of the ball screw nut as illustrated in FIG. 4, under normal operating conditions, expresses the output of the motor which is varied with respect to the position of the ball screw nut as illustrated in FIG. 5. Therefore, if the output of the motor can be restricted to a level allowing only normal operation, then any alien object existed during the clamping procedure, even if even subject to a slight mold closing force, would cause the machine unable to maintain the desired speed. The variation in speed, prolonged acting period, or accumulated position error by the servo control system can be used as items of the criteria used to judge whether abnormal conditions have taken place, thereby providing safe protection at any positions during the mold closing action.

The foregoing idea of the present invention is to change the restrictive output of the motor used to driving the movable platen to fasten the mold (it can be regarded as a conventional mold fastening action with capability of setting mold protection conditions with unlimited steps). Since the motor driving force is a transformation of the output torque of the motor, the motor driving force can be restricted and changed by means of changing the output current, referred to as limiting current, from the driver to the motor. The limiting current can be changed in the following ways: (A) by induction from basic mechanics, and (B) by adaptive adjustment.

(A) Changing the Limiting Current by Induction From Basic Mechanics

Conventional machines are weak in protection of mold because the mechanism advantage of the toggle mechanism is varied with respect to position. Therefore, if we can control K(s) and allow Fout to maintain at a constant (which allows the moving plate to move at a constant speed), the value of Fin(s) at all positions can be computed. From FIG. 2, the ratio of the speed at the input end (the sliding block D or the ball screw nut) to the speed at the output end (sliding block A or the movable platen) can be computed as follows:

$$\frac{V_D}{V_A} = \frac{c \times [\sin(\theta') + \tan(\phi)\cos(\theta')]}{b \times [\sin(\theta) + \tan(\beta)\cos(\theta)]}$$

wherein (referring to FIG. 7 and FIG. 2)

$V_D$ is the speed of a ball screw nut 10;

$V_A$ is the speed of the movable platen 5;

a is the length of a front arm 31;

b is the length of a rear arm 32 (In FIG. 7, $\alpha=0$, b=c);

c is the length of a second rear arm (referring to FIG. 2);

d is the length of a driving arm 34;

$\theta$ is the axial angle of the rear arm 32 with respect to the axis;

$\phi$ is the angle between the driving arm 34 and a ball screw 9;

$\beta$ is the axial angle of the front arm 31 with respect to the axis;

$\theta'=\alpha+\theta$ wherein $\alpha$ is the angle of the second rear arm (referring to FIG. 2)

When frictional loss is not taken into consideration, the mechanism advantage is the inverse of the speed ratio, i.e., $$K(s) = \frac{V_A}{V_D} = \frac{b \times [\sin(\theta) + \tan(\beta)\cos(\theta)]}{c \times [\sin(\theta') + \tan(\phi)\cos(\theta')]}$$

Thus, when the ball screw nut is within the mold protection range and set at a constant speed, Fout is mostly spent in coping against the frictional force and thus it can be approximately regarded as a constant value. Although the exact value is difficult to estimate, Fout still can be adjusted by operating the machine. As shown in FIG. 6, the control system needs just to set an approximate value for Fout, with which the motor output Fin(s) at each position can be obtained by calculation. After that, the operator sets a value for the correction factor $C_1\%$ so as to obtain the actual restrictive force in accordance with the following relationship:

$$F'in(s)=Fin(s)\times(1+C_1\%)$$

wherein

F'in(s) is the actual restrictive force;

Fin(s) is the theoretical restrictive force; and $C_1\%$ is the operator-set correction factor.

(B) Changing the Limiting Current by Adaptive Adjustment

Although the foregoing relationship rudimentarily serves as a model for obtaining the mold protective force, however, since friction is difficult to know in advance and Fout could be subject to violent variations due to, for example, acceleration and deceleration, structural change in mold, and so on, the result of the theoretical estimation would be far from ideal. Therefore, if we can monitor the actual output of the motor (i.e., the driving current) under normal operating conditions and then convert it into a limiting current to the motor, we will be able to achieve an adaptive control for protection of the mold at all positions. A preferred embodiment of this concept will be later described in this specification.

(2) Determining the Mold Protection End Point by the Mold Locking Force Auto Adjustment Method The ideal position for the protection end point is the position where the male mold and the female mold are about to come in touch with each other, such that even a small alien object as a filament, the mold could be adequately protected. The exact position at which the male mold comes into touch with the female mold is dependent on the mold locking force. An adjustment method for the mold locking force disclosed by the Applicant in U.S. Pat. No. 5,370,524 can be used to determine the relationship of the mold locking force with respect to the position of the movable platen (or ball screw nut). By means of the adjustment method, the end point for mold protection can be automatically set by the controller, thus freeing the operator from repetitive trials for the correct setting.

(3) The Use of Adaptive Servo Control System for Rapid, Safe Closing of the Mold Since the servo control system devised in accordance with the present invention is sensitive in response, there will be no limitation imposed by low speed as in conventional machines which employ hydraulic systems. When the restrictive value of the motor output is set during actual operation of the machine, any alien object that retard the movement would be immediately reflected in the load response of the servo control system, thus allowing the system to immediately carry out a protective action. In this case, the motor can produce an adequate output for maintaining the movement of the movable platen at constant speed, thus providing a safe protection for the mold.

It is therefore a primary objective of the present invention to provide an apparatus for protection of mold with a substantially consistent protective force at any positions when unlocking the mold.

It is another objective of the present invention to provide a method for protection of mold with a substantially consistent protective force at any positions when unlocking the mold.

In accordance with the foregoing and other objectives of the present invention, a new and improved apparatus and method for protection of mold when unlocking the mold is provided.

The method comprises the steps of (1) changing the restrictive value of torque for the servo motor so as to obtain an equal mold protective force; and (2) compute for the relationship between mold locking force and movable platen to accordingly determine an end point for protection of the mold according to a mold locking force adjustment method.

The apparatus comprises a controller coupled to an encoder which produces digital data representative of the motor driving current produced by the motor driver. The controller generates a digital position control signal and a digital motor current limiting signal based on position speed, and current detected from the motor. The digital position control signal and the digital motor current limiting signal are subsequently converted into analog form and sent to the driver for the driver to accordingly drive the motor to produce a corresponding mold protective force.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 7:
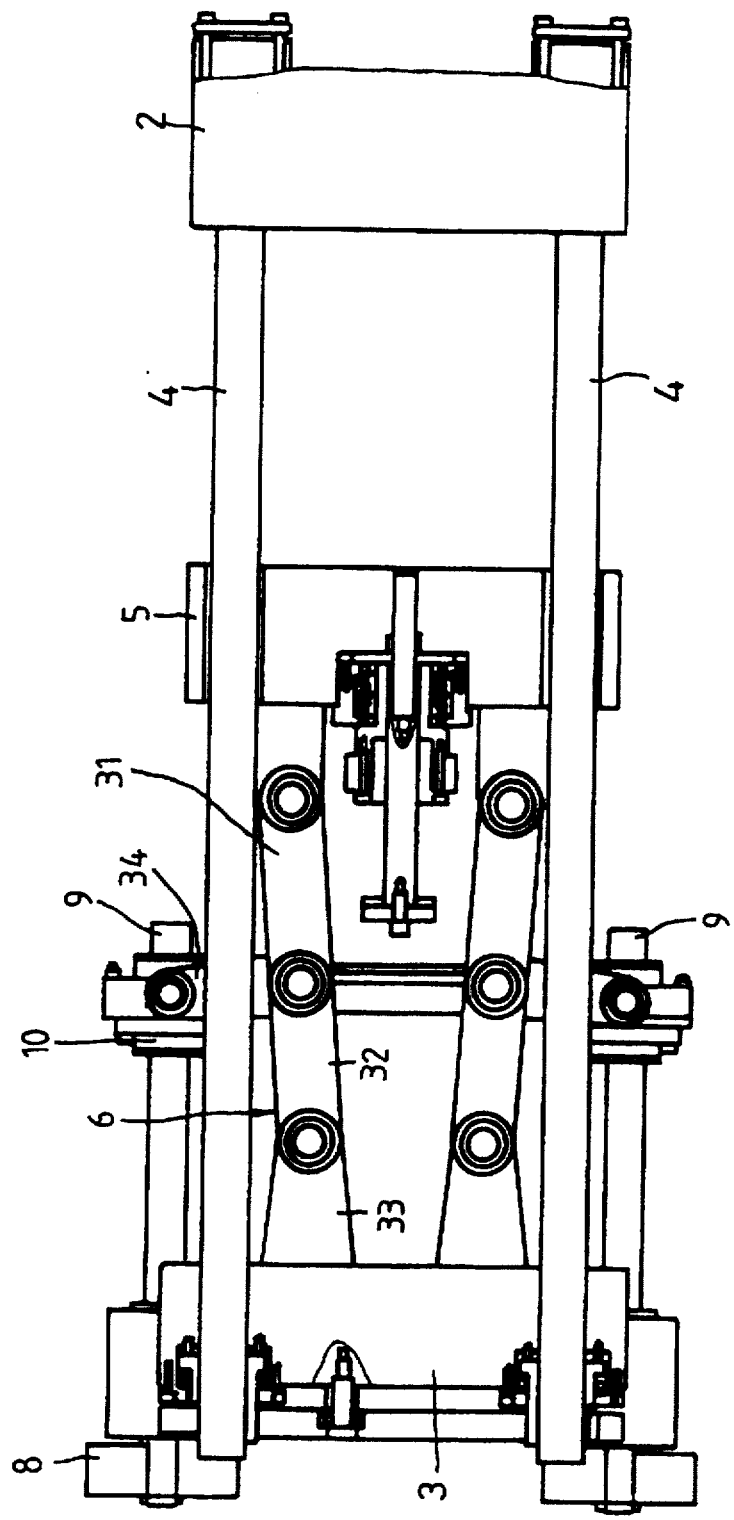
FIG. 7 shows a top plan view of a motor-driven clamping unit.
Figure 8:
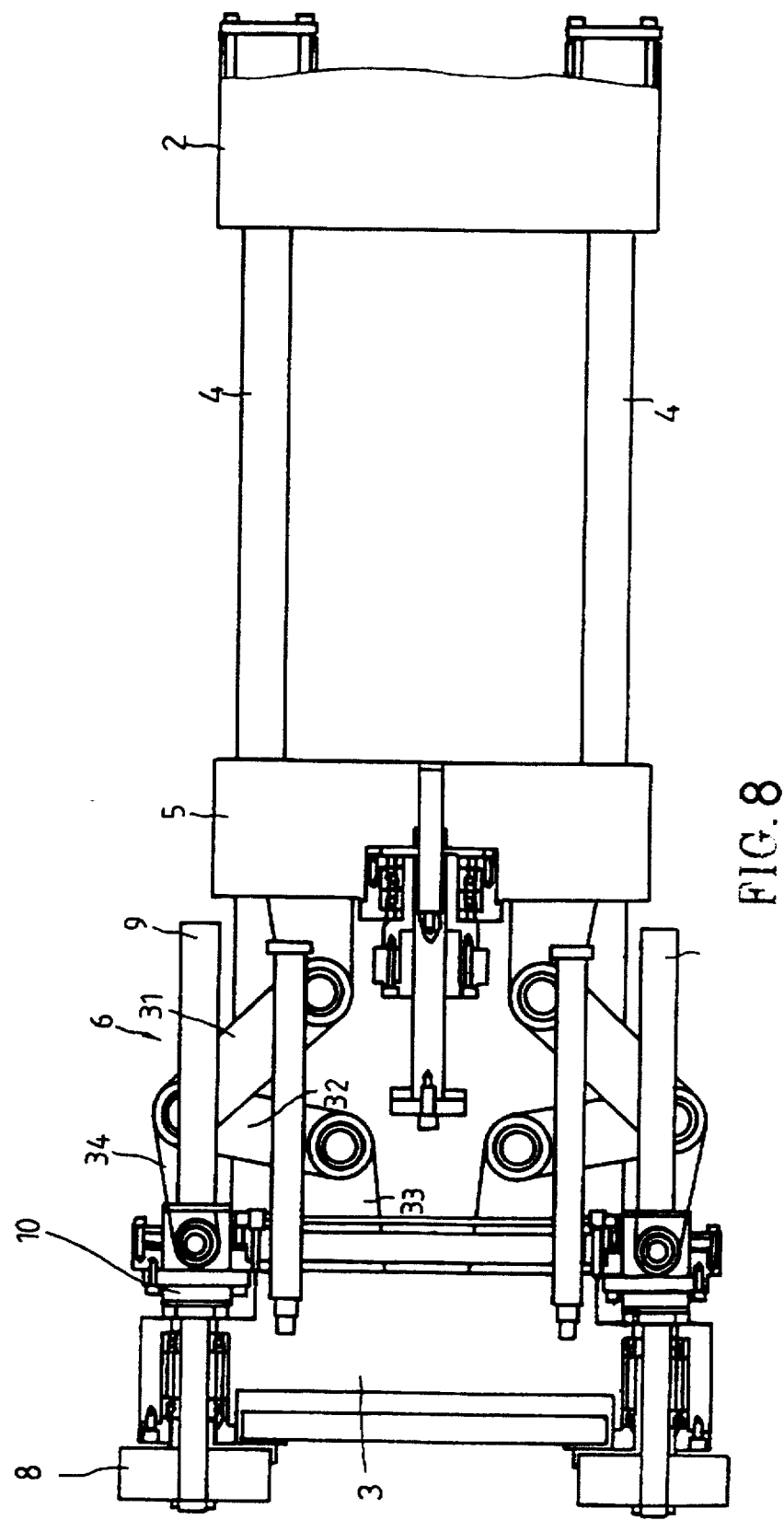
FIG. 8 shows a top plan view of the motor-driven clamping unit in which the moving plate is moved to another position.

FIGS. 7 and 8 show the motor-driven clamping unit according to the present invention, in which the movable platen 5 is linked to the rear platen 3 by means of an outward-bending toggle mechanism 6 and is driven by a servo motor 25 (schematically shown in FIG. 9) mounted on the rear platen 3. The driving force from the servo motor 25 is transmitted through a passive wheel 8, a ball screw 9, and a ball screw 10 to the toggle mechanism 6 so as to drive the toggle mechanism 6 to lock or unlock the mold.

Figure 9:
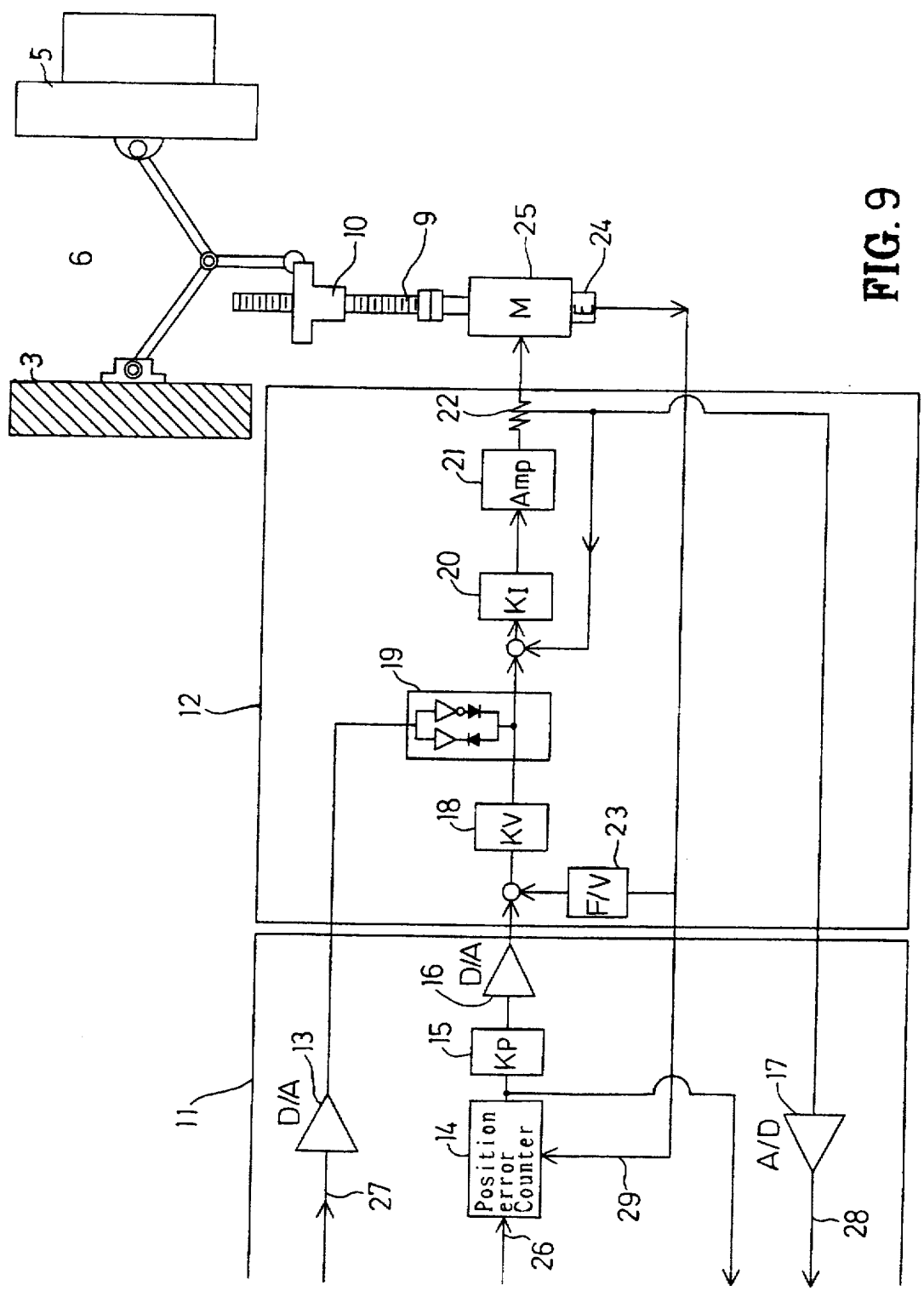
FIG. 9 is a schematic diagram showing the control system of the apparatus according to the present invention.

FIG. 9 is a schematic diagram showing the control system of the apparatus according to the present invention, which includes an encoder 24 which detects and converts the position and velocity of the servo motor 25 into digital form transmitted via a signal line 29. The block labeled with the numeral 12 shows the circuit structure of a motor driver which accepts the feedback signal via the signal line 29 from the encoder 24 to thereby generate a driving current to the servo motor 25. The motor driver 12 is composed of a velocity loop compensator 18, a current limiting circuit 19, a current loop compensator 20, an amplifier 21, a current sensor 22, and a frequency-to-voltage converter 23. The block labeled with the numeral 11 shows the circuit structure of a PC-based controller which serves as a main control unit for the motor-driven clamping unit. The controller 11 is capable of generating a position control signal 26 and a motor current limiting signal 27 according to the control method for the mold closing mechanism. The position control signal 26 is processed in succession by a position error counter 14 and a position loop compensator 15. The output of the position loop compensator 15, which is in digital form, is converted by an digital-to-analog (D/A) converter 16 into an analog signal that is subsequently received by the motor driven 12. The motor current limiting signal 27, which is also in digital form, is converted by a D/A converter 13 into an analog signal that is subsequently received by the current limiting circuit 19 in the motor driver 12. Besides, the controller 11 includes an analog-to-digital (A/D) converter 17 for converting the output motor driving current from the motor driver 12, which is detected by the current sensor 22 into a digital signal named I-Monitor 28 which is used for the apparatus of the present invention to set the value of the limiting current accordingly.

Figure 10A:
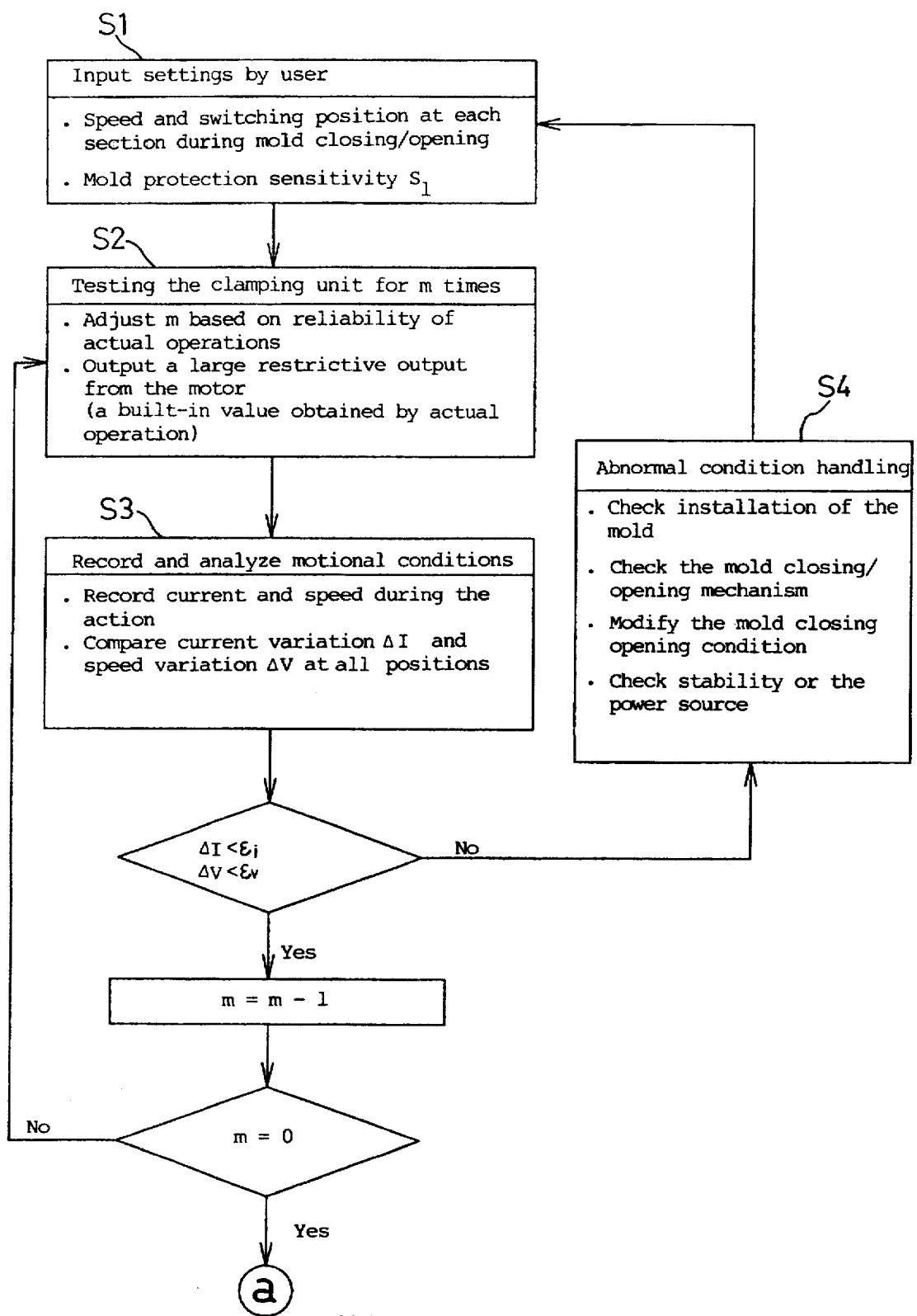
FIG. 10A and FIG. B are flow diagrams showing the procedural steps of adaptive adjustment protection of mold according to the present invention.
Figure 10B:
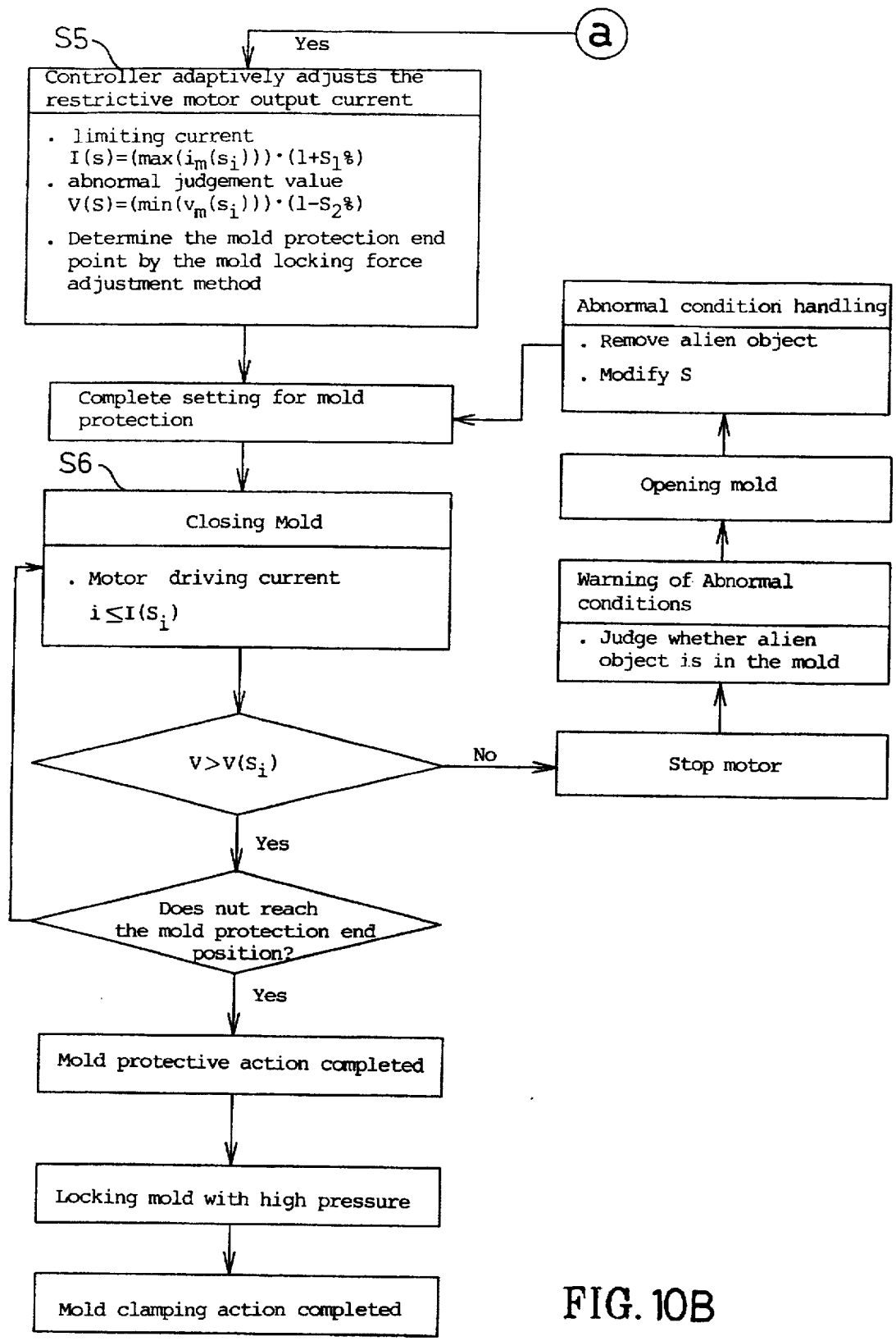

FIG. 10A and FIG. 10B are flow diagrams showing the procedural steps involved in a method carried out by the apparatus according to the present invention for adaptive adjustment of the clamping unit for protective purpose.

In the first step S1, the user sets the parameters of speeds, switching position, and mold protection sensitivity ($S_1\%$) for the apparatus to carry out adaptive adjustment for the mold closing action. The value of $S_1$ corresponds to the level of the driving force of the motor. The user can set $S_1$ with a value for a reliable adjustment that would not cause the apparatus to misjudge a normal operation as abnormal and also for safe protection that would protect the mold fixture whenever an alien object is under small load.

In the subsequent step S2, the mold closing action is tested for m times. During the test, the speed is based on the user specified setting in the first step S1 and the controller gives a larger restrictive output to the motor (the restrictive output is preset with a built-in value that would assure normal operation under any conditions). The times m of the test can be arbitrarily adjusted based on the condition of the machine.

Figure 1:
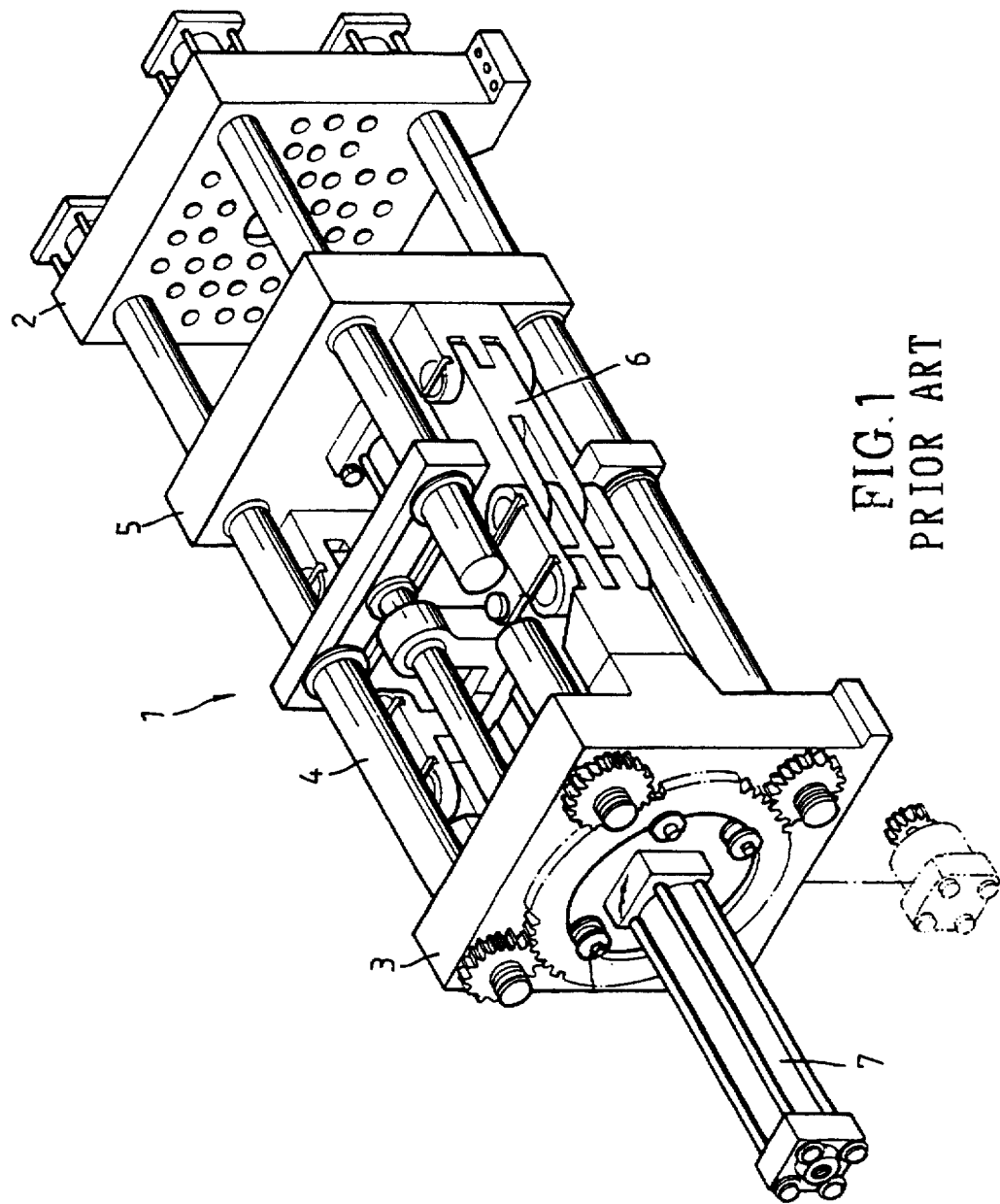
FIG. 1 shows a perspective view of a conventional crank-type clamping unit which is driven by an hydraulic system.
Figure 2:
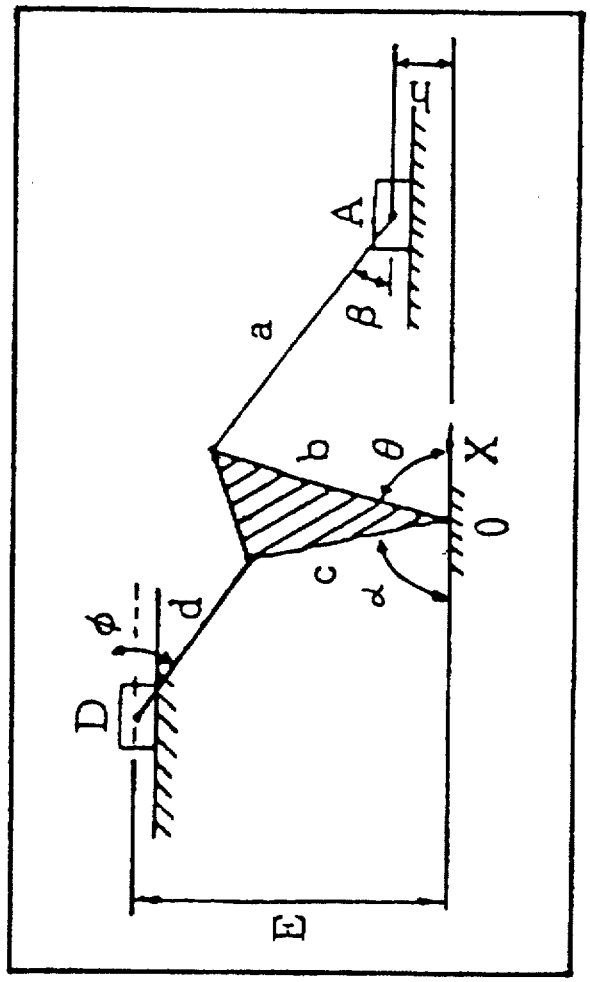
FIG. 2 shows a schematic diagram depicting the characteristics of a toggle linkage.
Figure 3:
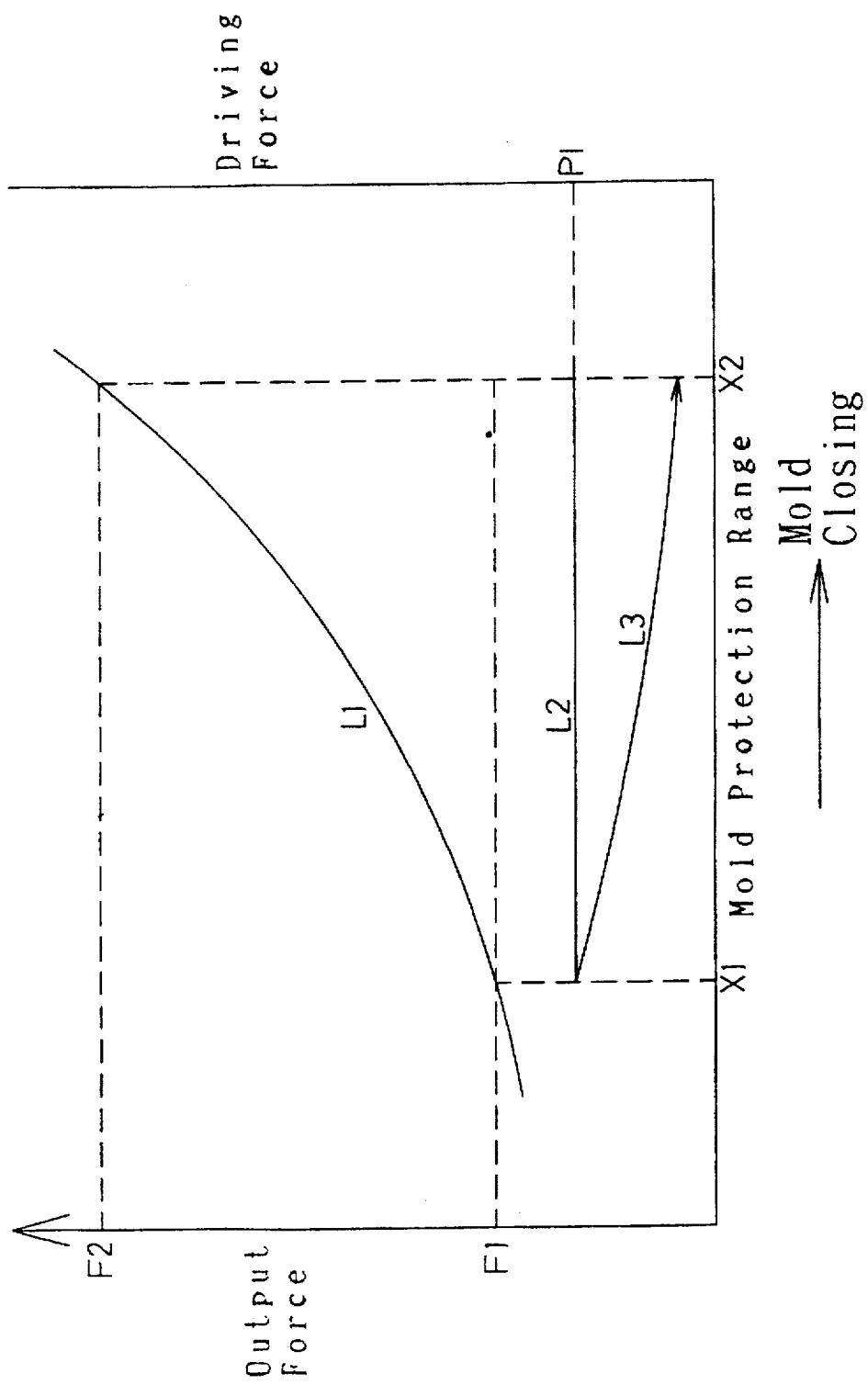
FIG. 3 is a graph showing the characteristic plots of the present invention and conventional apparatus.
Figure 4:
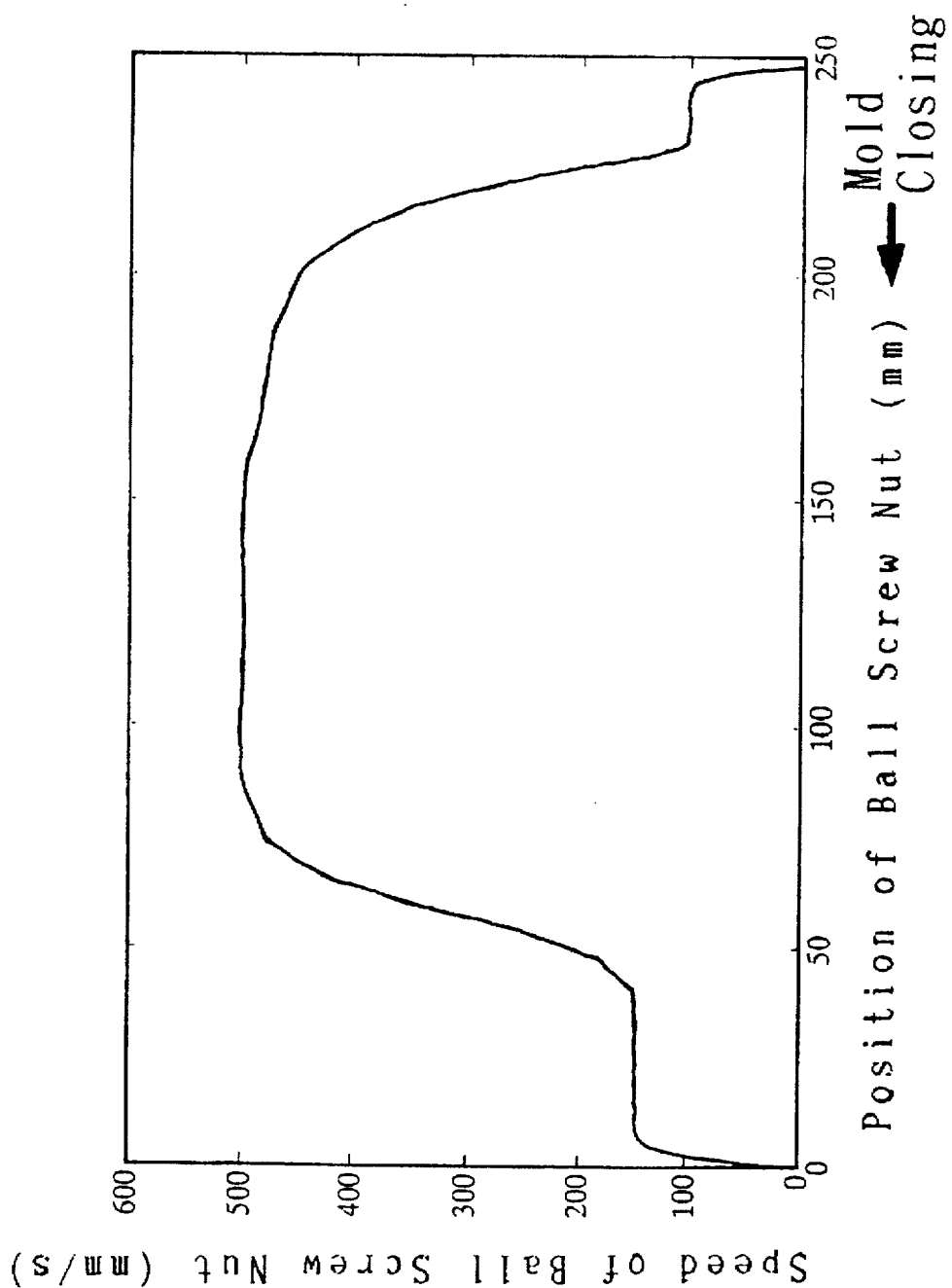
FIG. 4 is a graph showing a characteristic plot of speed versus position of the ball screw nut achieved by the prior art.
Figure 5:
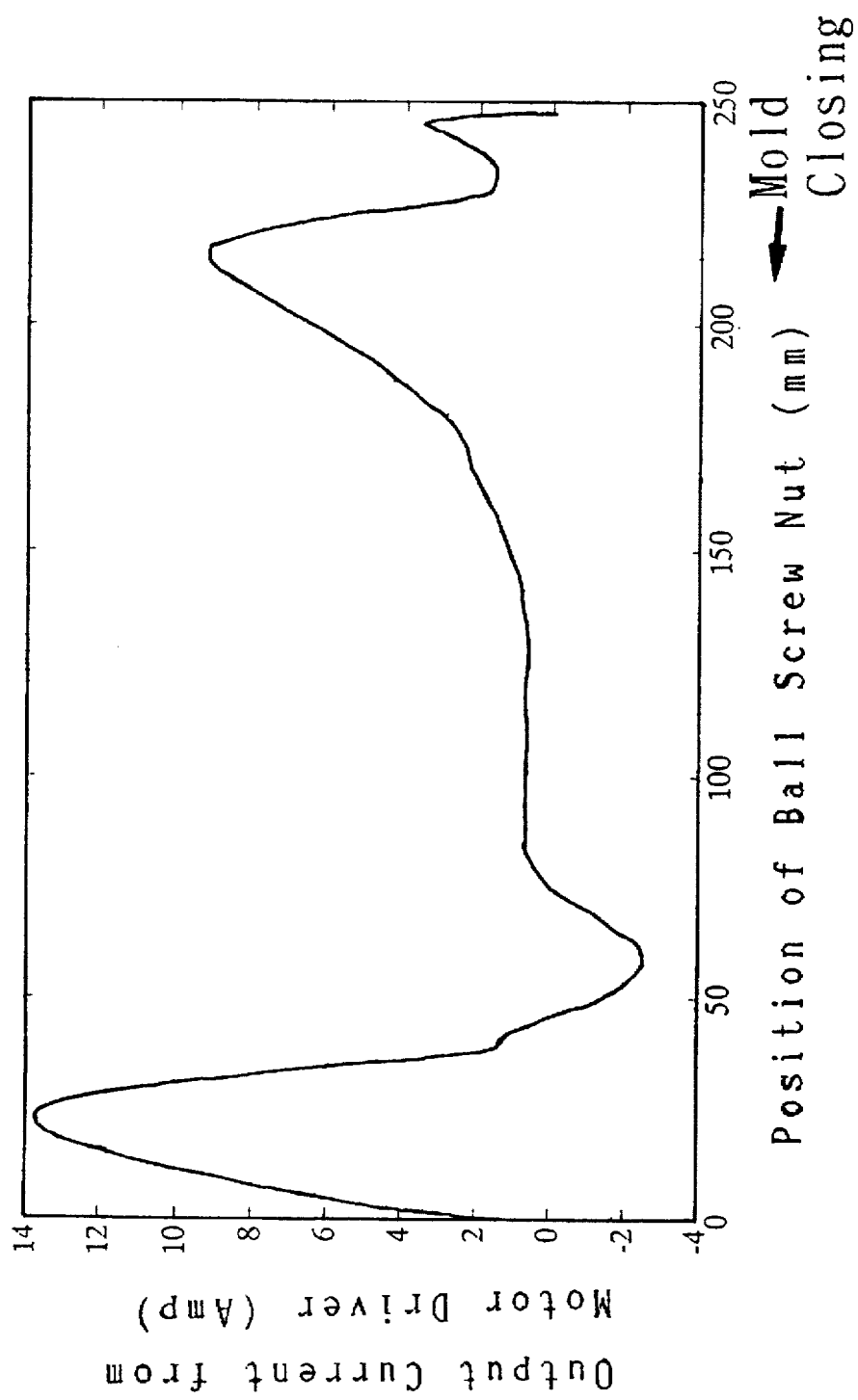
FIG. 5 is a graph showing a characteristic plot of motor driving current output versus position of the ball screw nut according to FIG. 4 under normal action condition.
Figure 6:
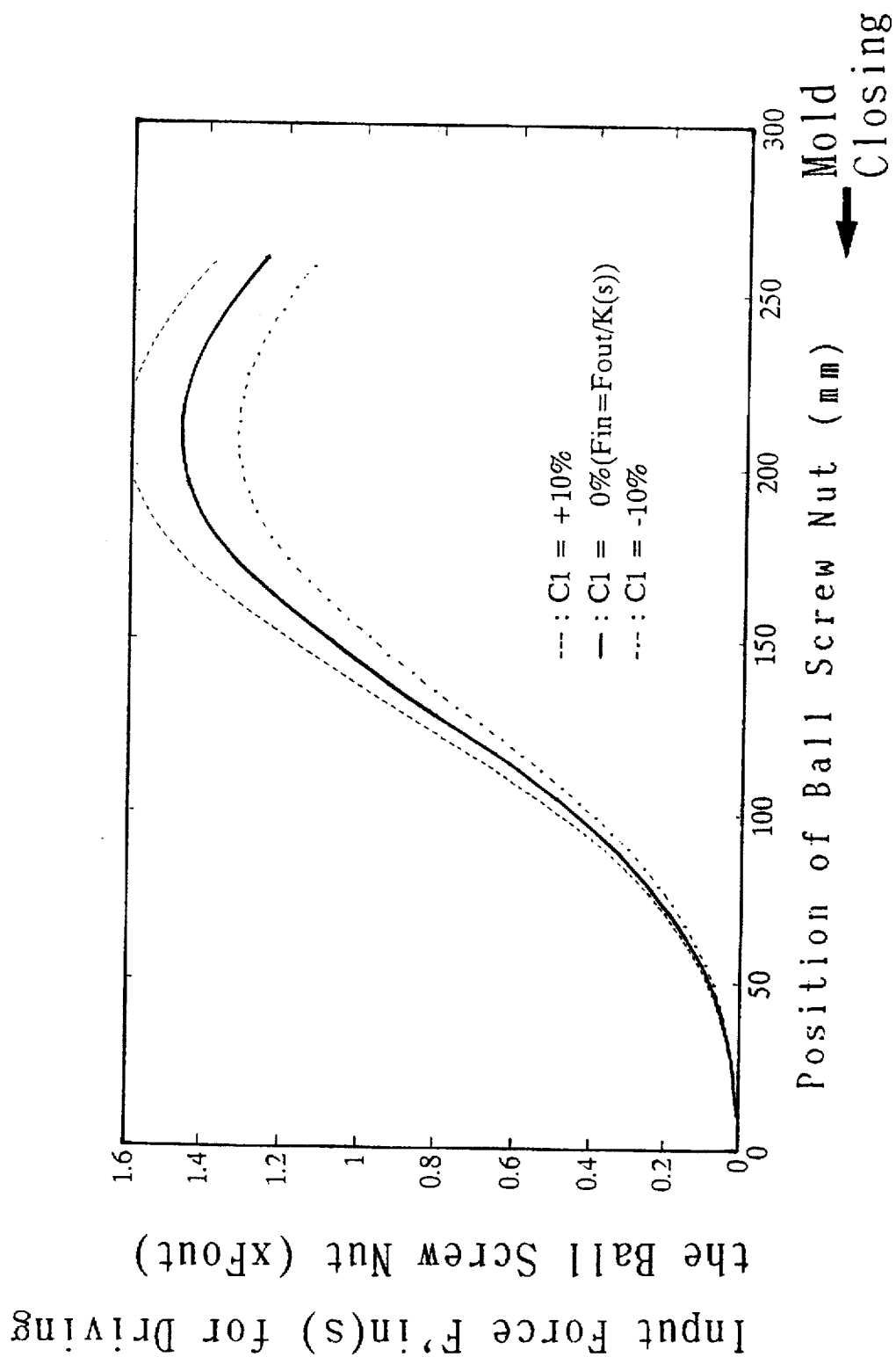
FIG. 6 is a graph showing the theoretical plots of input force for driving the ball screw nut versus position of the ball screw nut.
Figure 11:
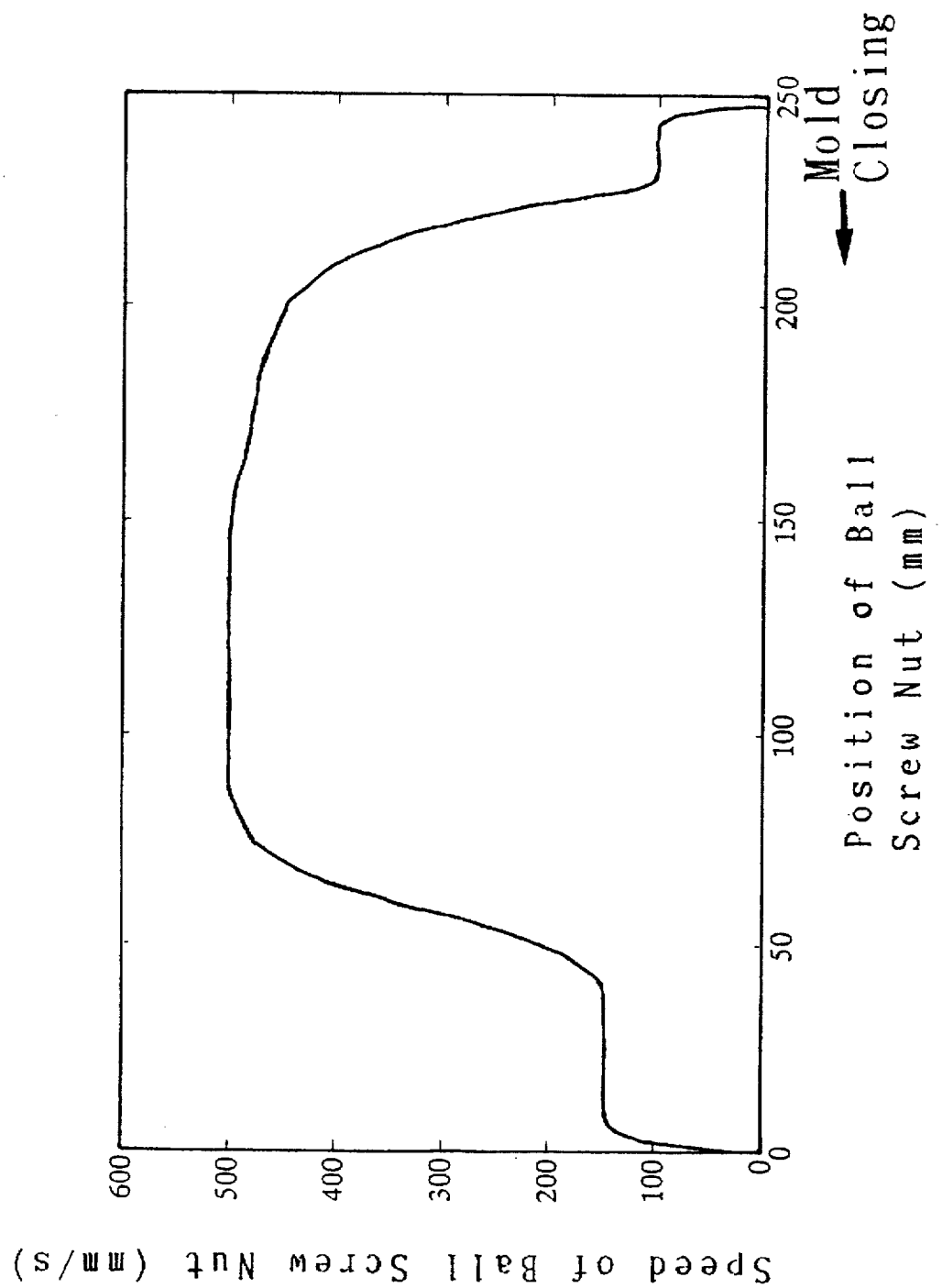
FIG. 11 is a graph showing a characteristic plot of speed versus position of the ball screw nut achieved by 5 times closing action according to the operator-set conditions of the present invention.
Figure 12:
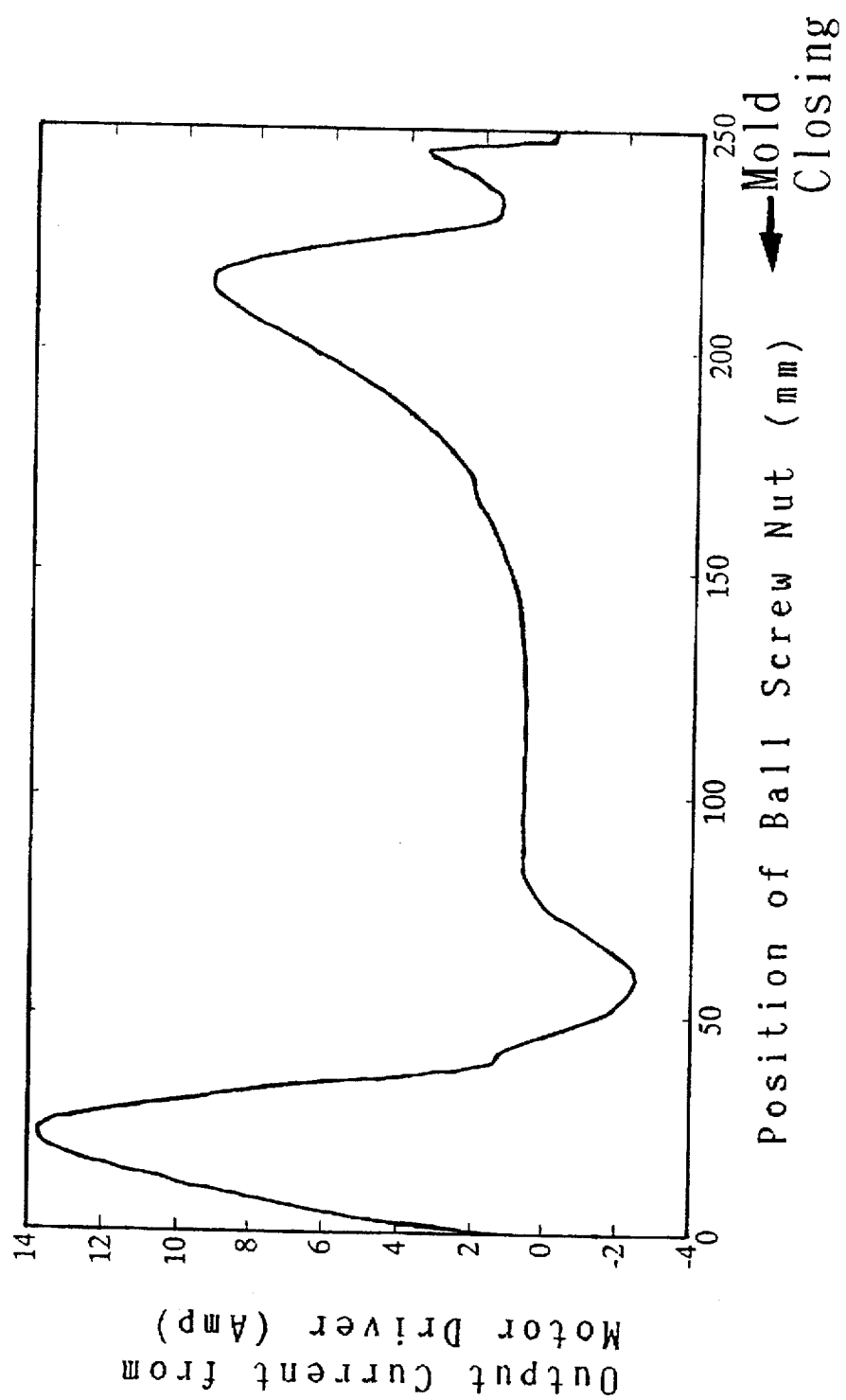
FIG. 12 is a graph showing a characteristic plot of motor driving current output versus position of the ball screw nut achieved by 5 times closing action according to the operator-set conditions of the present invention.

In the subsequent step S3, the condition of the mold closing action is recorded and analyzed. During the m times of test, the controller detects the response of the motor output current versus the speed (or the position error count). If all the m times of test are normal and the variation of current ΔI and the variation of speed ΔV at each position are maintained within acceptable ranges (i.e., $\Delta I < \epsilon_i$, $\Delta V < \epsilon_V$), then the procedure goes to the step S5; otherwise if any one of the conditions $\Delta I < \epsilon_i$, and $\Delta V < \epsilon_V$ is not met, the procedure goes to step S4 in which the apparatus generates an alarm signal so as to notify the technical personnel to inspect the machine and fix any problems including modifying the settings and checking the stability of the power source. After that, the procedure returns to step S1 to start the foregoing steps again. In this embodiment, if the user sets the mold closing speed as that shown in FIG. 4, then after the fifth test, the speed variation (FIG. 11) and the motor output variation (FIG. 12) will each not exceed an error of 5% in stability. The high stability would allow sensitive response for protection of the mold, thus enhancing the safety factor of the machine.

In the step S5, the controller adaptively adjusts the restrictive motor output current. After the reliability of the mold closing action is approved after m times of test, the maximum current level that has been produced from the m times of test is taken as a base for the restrictive current, i.e., $$I_0(s) = (i_0(S_1)) = \max(i_m(S_1))$$

and the sensitivity $S_1\%$ set by the operator is used to adjust the desired restrictive current $I(s)$, i.e., $$I(s) = I_0(s) \times (1 + S_1\%).$$

Figure 13:
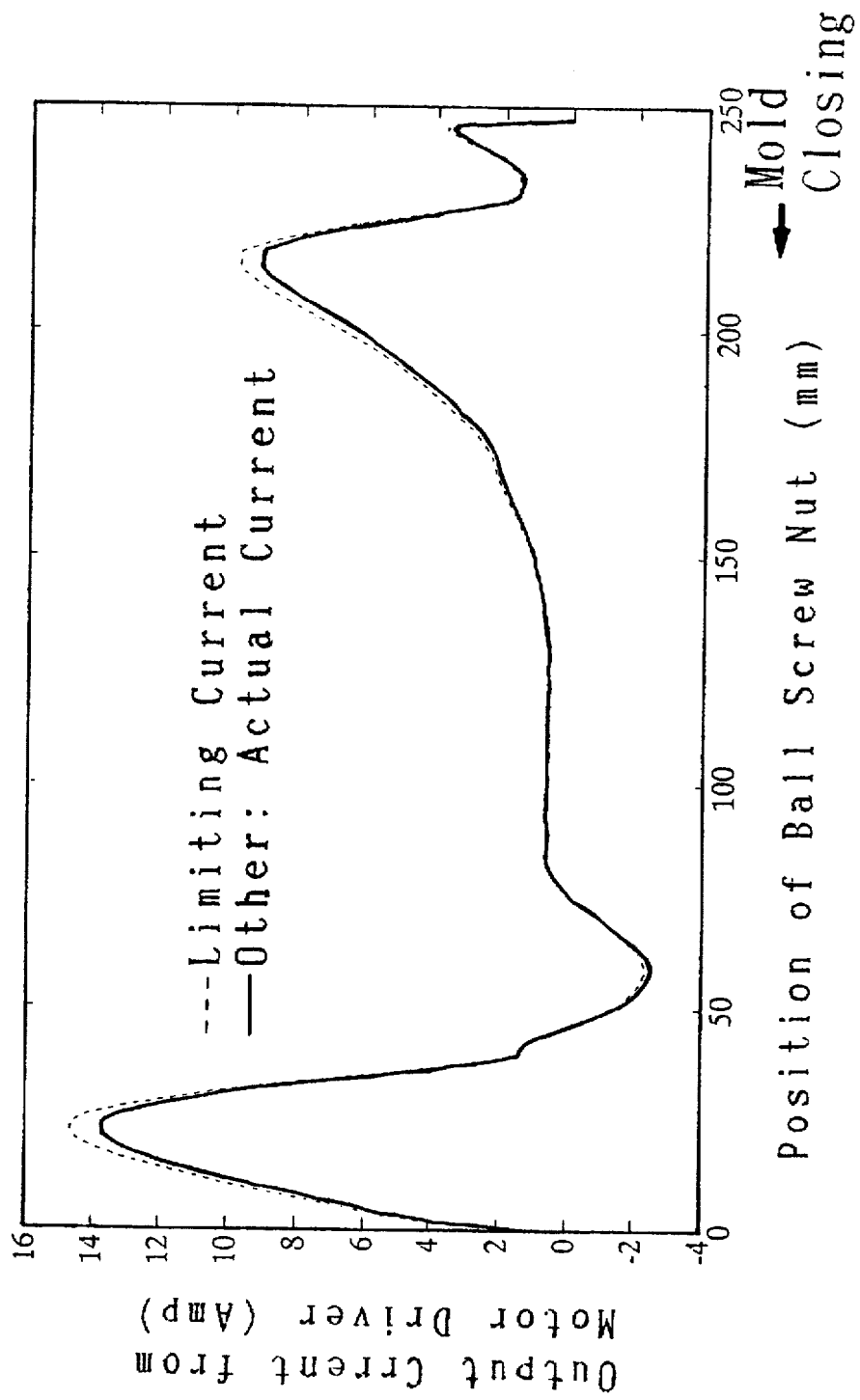
FIG. 13 is a graph showing a characteristic plot of motor driving current output versus position of the ball screw nut achieved by a sufficient closing action according to adaptive adjustment protection of the present invention.

If, for example, $S_1\%$ is set at 7.5%, the restrictive current to the motor will be as the dotted plot shown in FIG. 13.

Furthermore, the controller is provided with a criterion for the judgment of abnormal conditions. Period of operation, error in speed, and position error count can be used as basis for the judgment of abnormal conditions. In the preferred embodiment, the minimum speed level that has been achieved from the m times of test is taken as a basis for the judgment of abnormal conditions, i.e., $$V_0(S) = V_0(S_i) = \min(V_m(S_1))$$

and the speed $V_0(S)$ is to be adjusted according to the following equation:

$$V(s) = V_0(S_i) \times (1 - S_2\%)$$

where $S_2$ is an adaptively corrected parameter. With this setting, the controller is able to carry out a protective alarming action when the actual speed in the machine is lower than the detected V(S).

During the mold closing action when the male mold comes into contact with the female mold, the output of the motor is not only used to conquer the frictional force of the motor, but mostly causes the forming of a self-locking force that would cause deformation to mechanical parts (such as the tie bars 4) of the machine. Accordingly, the end point of the protection is at the position where the male and female molds contact but not subject to the force. In accordance with the mold locking force adjustment method, which is disclosed in U.S. Pat. No. 5,370,524 by the applicant, the controller is able to directly determine the end point, which frees the burden of the technical personnel in determining the same by repetitive testing.

In the step S6, when the speed of closing the mold is lower than V(S) after foregoing adaptive adjustment for mold protection is completed, the controller will immediately cease the motor output so as to protect the mold and meanwhile clamp the driving current of the motor by I(S). Therefore, regardless of the thickness of the alien object, the mold can be appropriately protected.

The method and apparatus according to the present invention utilized continuously variable motor output in conjunction with mechanics characteristics of the toggle mechanism to maintain a substantially constant mold protective force at all positions. Furthermore, the mold protective force can be adaptively adjusted with respect to different types of molds and motional conditions so that the mold can be adequately protected whenever abnormal condition occurs during mold closing action. The motor output will thus not unduly increased to a great level that would damage the mold, the machine, or even the operators. The drawbacks of the prior art are thus eliminated.

Furthermore, in other embodiments the restrictive motor output can be directly converted to a driving torque for the motor under torque mode. This allows protection on part of the mold closing course or on the whole of the same. The continuously variable restrictive motor output scheme used by the present invention can also be used on electrical motor-driven single crank clamping unit and rocker clamping unit. Also, the continuously variable restrictive motor output scheme can be modified into a multi-step mold protection scheme. The end point for the protection can also be set by the operator instead of the contact position which is automatically detected by the machine. Besides injection molding machine, the present invention can also be used on other types of toggle mechanism based mold fixtures such as die cast machines, auto-molding machines, and so on.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for using a clamping unit for making a mold, said clamping unit having a movable platen which is linked to a rear platen by means of a toggle mechanism and is driven by a servo motor, from which a driving force is transmitted through a ball screw and a ball screw nut to the toggle mechanism, said method comprising the steps of:

(1) varying a restrictive torque value for the servo motor so as to obtain an optimum mold protective force; and (2) computing a relationship between a mold locking force and the movable platen according to a mold locking force adjustment method to accordingly determine an end point for protection of the mold;

(3) wherein the restrictive torque value for the servo motor is obtained according to the following sub-steps:

(i) computing the mechanism advantage of the toggle mechanism, K(s), according to the following equation:

$$K(s) = \frac{V_A}{V_D} = \frac{b \times [\sin(\theta) + \tan(\beta)\cos(\theta)]}{c \times [\sin(\theta') + \tan(\phi)\cos(\theta')]}$$

wherein:

K(s) is the mechanism advantage of the toggle mechanism which varies with respect to the position of the ball screw nut;

$V_A$ is the speed of the movable platen;
$V_D$ is the speed of the ball screw nut;
b is the length of a first rear arm of the toggle mechanism;
c is the length of a second rear arm of the toggle mechanism;
θ is the axial angle of the first rear arm with respect to an axis of the clamping unit;
ψ is the angle between a driving arm of the toggle mechanism and the ball screw;
β is the axial angle of a front arm of the toggle mechanism with respect to the axis; and
θ'=α+θ wherein α is the angle of the second rear arm with respect to the axis;
(ii) computing the theoretical restrictive force according to the following equation:

$$Fin(s) \times K(s) = Fout$$

wherein s is the position of the ball screw nut;
Fout is the force required to move the movable platen at a desired speed; and
Fin is the driving force generated by the motor;
(iii) calculating the restrictive force according to the following equation:

$$Fin'(s) = Fin(s) \times (1+C_1\%)$$

wherein
Fin'(s) is the actual restrictive force;
Fin(s) is the theoretical restrictive force, which is also the driving force generated by the motor; and
$C_1\%$ is the operator-set correction factor.

2. A method as claimed in claim 1, wherein said step (1) further comprises the steps of:
(S1) setting a plurality of parameters including speeds, switching position, and mold protection sensitivity;
(S2) carrying out a test of mold clamping action for m times, wherein m is a positive integer;
(S3) recording and analyzing a condition of the mold closing action, such that if all the m times of test are normal and a variation of current ΔI and a variation of speed ΔV at each position are maintained within acceptable ranges $\Delta I < \epsilon_i$, $\Delta V < \epsilon_v$, wherein $\epsilon_i$ and $\epsilon_v$ are predetermined values, then moving to step (S5), otherwise, moving to step (S4);
(S4) generating an alarm signal so as to notify an operator to inspect the clamping unit, then returning to step (S1);
(S5) adaptively adjusting an output restrictive current from the servo motor, such that, after reliability of mold closing action is approved after m times of test, calculating the restrictive current $I_0(s)$ or ($i_0(s_i)$) according to the following equations:

$$I_0(s) = (i_0(s_i)) = \max(i_m(s_i))$$

$$I(s) = I_0(s) \times (1+S_1\%)$$

where I(s) is the restrictive current to be used, $S_1\%$ is a predetermined sensitivity, $i_m(s_i)$ is the current measured during each of the m times of test; and
calculating a minimum speed level $V_0(s)$ or ($V_0(s_i)$) in accordance with the following equations:

$$V_0(s) = (V_0(s_i)) = \min(V_m(s_i))$$

$$V(s) = V_0(s) \times (1+S_2\%)$$

wherein
$S_2$ is an adaptively corrected parameter; and
$V_m(S_i)$ is the speed measured during each of the m times of test;
whereby the operator is able to carry out a protective alarming action when the actual speed in the clamping unit is lower than the calculated V(s).

3. A method for using a clamping unit for making a mold, said clamping unit having a movable platen which is linked to a rear platen by means of a toggle mechanism and is driven by a servo motor, from which a driving force is transmitted through a ball screw and a ball screw nut to the toggle mechanism, said method comprising the steps of:
(1) varying a restrictive torque value for the servo motor so as to obtain an optimum mold protective force; and
(2) computing a relationship between a mold locking force and the ball screw nut according to a mold locking force adjustment method to accordingly determine an end point for protection of the mold;
(3) wherein the restrictive torque value for the servo motor is obtained according to the following sub-steps:
(i) computing the mechanism advantage of the toggle mechanism, K(s), according to the following equation:

$$K(s) = \frac{V_A}{V_D} = \frac{b \times [\sin(\theta) + \tan(\beta)\cos(\theta)]}{c \times [\sin(\theta') + \tan(\phi)\cos(\theta')]}$$

wherein:
K(s) is the mechanism advantage of the toggle mechanism which varies with respect to the position of the ball screw nut;
$V_A$ is the speed of the movable platen;
$V_D$ is the speed of the ball screw nut;
b is the length of a first rear arm of the toggle mechanism;
c is the length of a second rear arm of the toggle mechanism;
θ is the axial angle of the first rear arm with respect to an axis of the clamping unit;
ψ is the angle between a driving arm of the toggle mechanism and the ball screw;
β is the axial angle of a front arm of the toggle mechanism with respect to the axis; and
θ'=α+θ wherein α is the angle of the second rear arm with respect to the axis;
(ii) computing the theoretical restrictive force according to the following equation:

$$Fin(s) \times K(s) = Fout$$

wherein s is the position of the ball screw nut;
Fout is the force required to move the movable platen at a desired speed; and
Fin is the driving force generated by the motor;
(iii) calculating the restrictive force according to the following equation:

$$Fin\ 40\ (s) = Fin(s) \times (1+C_1\%)$$

wherein
Fin'(s) is the actual restrictive force;
Fin(s) is the theoretical restrictive force, which is also the driving force generated by the motor; and
$C_1\%$ is the operator-set correction factor.

4. A method as claimed in claim 3, wherein said step (1) further comprises the steps of:
- (S1) setting a plurality of parameters including speeds, switching position, and mold protection sensitivity $S_1\%$;
- (S2) carrying out a test of mold clamping action for m times, wherein m is a positive integer;
- (S3) recording and analyzing a condition of the mold closing action, such that if all the m times of test are normal and a variation of current $\Delta I$ and a variation of speed $\Delta V$ at each position are maintained within acceptable ranges $\Delta I < \epsilon_i$, $\Delta V < \epsilon_v$, wherein $\epsilon_i$ and $\epsilon_v$ are predetermined values, then moving to step (S5) otherwise, moving to step (S4);
- (S4) generating an alarm signal so as to notify an operator to inspect the clamping unit, then returning to step (S1);
- (S5) adaptively adjusting an output restrictive current from the servo motor, such that, after reliability of mold closing action is approved after m times of test, calculating the restrictive current $I_0(s)$ or $(i_0(s_i))$ according to the following equations:

$$I_0(s) = (i_0(s_i)) = \max(i_m(s_i))$$

$$I(s) = I_0(s) \times (1 + S_1\%)$$

where I(s) is the restrictive current to be used, $S_1\%$ is a predetermined sensitivity, $i_m(s_i)$ is the current measured during each of the m times of test; and calculating a minimum speed level $V_0(s)$ or $(V_0(s_i))$ in accordance with the following equations:

$$V_0(s) = (V_0(s_i)) = \min(V_m(s_i))$$

$$V(s) = V_0(s) \times (1 + S_2\%)$$

wherein $S_2$ is an adaptively corrected parameter; and $V_m(S_i)$ is the speed measured during each of the m times of test;

whereby the operator is able to carry out a protective alarming action when the actual speed in the clamping unit is lower than the calculated V(s).

* * * * *